C. DANIEL AND E. A. JUHNKE.
SAFETY DEVICE FOR PREVENTING MOTOR CARS FROM OVERTURNING.
APPLICATION FILED OCT. 16, 1919.

1,373,655. Patented Apr. 5, 1921.

INVENTORS,
C. Daniel,
E. A. Juhnke,
BY Hazard & Miller
ATTORNEYS.

UNITED STATES PATENT OFFICE.

CHARLES DANIEL, OF HUNTINGTON PARK, AND EDWARD A. JUHNKE, OF LOS ANGELES, CALIFORNIA.

SAFETY DEVICE FOR PREVENTING MOTOR-CARS FROM OVERTURNING.

1,373,655.  Specification of Letters Patent.  Patented Apr. 5, 1921.

Application filed October 16, 1919. Serial No. 331,251.

*To all whom it may concern:*

Be it known that we, CHARLES DANIEL and EDWARD A. JUHNKE, citizens of the United States, residing at Huntington Park and at Los Angeles, respectively, in the county of Los Angeles and State of California, have invented new and useful Improvements in Safety Devices for Preventing Motor-Cars from Overturning, of which the following is a specification.

This invention relates to safety appliances for automobiles and has for its object to provide a device that will automatically assume a supporting position in the event that the automobile turns turtle or tends to turn over sidewise, and further has for its object to provide a device of the kind that is at once simple, substantial, is readily acting, and can be applied to various types of vehicles with readiness and at little expense and that will not require any material alteration or change in the construction of the vehicle to which it may be applied; and the invention consists of the construction and features, forms of which are illustrated in the accompanying drawing and herein described and claimed.

Figure 2:
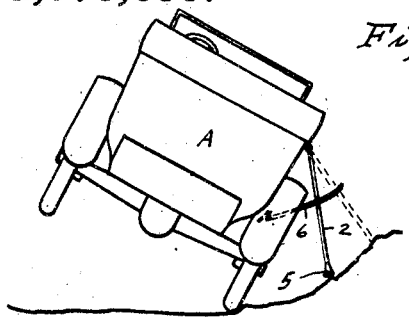
Fig. 2 is an end view in elevation of the vehicle in a tilted position showing the action of the device.

A simple form of the invention is illustrated in which a leg member 2 has its upper end pivotally mounted in a bracket 3 designed to be secured to the upper portion of the side of a vehicle as by bolts 4 which may be passed through holes provided therefor in the base of the bracket. The lower end of the swinging leg 2 may be provided with a caster or roller 5 arranged with axis which is substantially parallel to the axes of the axles of the automobile, so that when the leg 2 swings outwardly because of the tilting of the automobile A, as in Fig. 2, the wheel 5 will run along the surface so that it may engage with reduced friction.

When the swinging leg 2 swings to an outward position it is automatically locked and braced by a pawl or link member 6, the lower end of which is mounted on a pivot 7 shown as formed on a bracket 8 that may be attached by bolts or otherwise to the lower portion of the side of the vehicle substantially vertically below the upper bracket 3 so that the swinging members 2 and 6 will actuate in a common plane.

Figure 4:
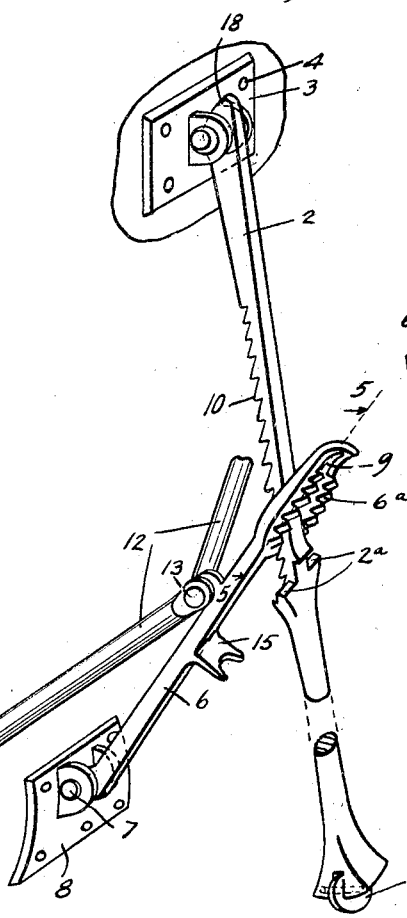
Fig. 4 is a perspective view of the device partly swung open and showing but a portion of the braces.
Figure 5:
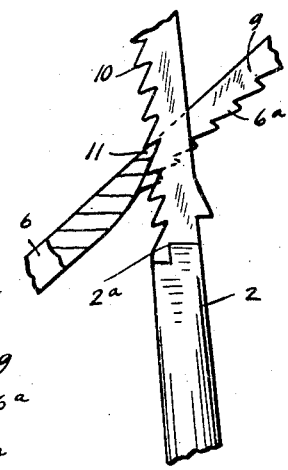
Fig. 5 is a sectional detail of interlocked fragments of the locking pawl and leg.

The outer end of the pawl or locking link 6 is shown as bifurcated or provided with a slot 9 in which the leg 2 may play to permit the folding or distention of the members, and in order to lock the leg 2 at any of its angular positions when moved outwardly, one of its faces is provided with a rack 10 the teeth of which are selectively engaged and interlocked with a locking tooth 11 formed at the base of the channel 9 in the end of the locking pawl 6, this action being clearly shown in Figs. 2, 4 and 5. In the event that the leg 2 swings outwardly substantially to a right angular position with respect to the body of the automobile A then the outer end of the locking pawl 6 is designed to engage with a toothed portion $2^a$ of or at the bottom of the leg, and this toothed portion will interlock with a rack or racks $6^a$ formed on the lower surface of the outer end of the locking pawl 6 and this will effectually prevent the inward collapsing of the unfolded members so as to support the vehicle in an inclined position.

Figure 1:
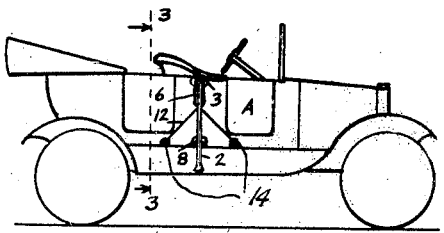
Figure 1 is a side elevation of an automobile to which the device has been applied.
Figure 3:
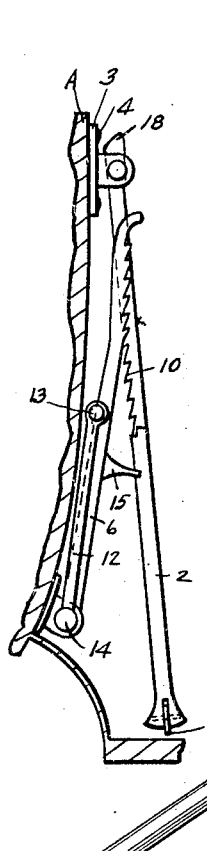
Fig. 3 is a sectional view on line 3—3 of Fig. 1 through a portion of the body showing the device in its collapsed position.

The locking pawl 6 is preferably braced against play laterally by means of braces 12 pivoted at 13 intermediate of the length of the pawl 6 and mounted on alined pivots or bearings 14, Fig. 1, these bearings also preferably alining with the axis of the pivot 7 on which the pawl 6 swings.

The device is adapted to be folded into compact position adjacent to the side of the vehicle and the outer end of the pawl 6 is shown as curved outwardly so as to permit the leg 2 to be swung close in to the body and overlap the outer and upwardly extending face of the pawl 6, this outer face being provided preferably with a keeper 15 in the form of a yoke-shaped member, the crotch of which forms a seat in which the adjacent body portion of the leg 2 will lie and be held against vibration, and when also seated the leg 2 will lie at an angle of about 15° from the vertical in its seat so that it will press thereon substantially to keep it steady.

When the leg is thrown to its outermost position the weight of the car is somewhat relieved from the pivot on which the leg swings by reason of a shoulder 18 swinging into abutting contact with the adjacent surface of the plate 3 and also this shoulder 18 serves to coöperate with the closed end of the pawl 6 to limit the outward movement beyond the angle indicated in dotted lines in Fig. 2.

Various changes may be made without departing from the spirit of our invention as claimed.

We claim:

1. A device for preventing the lateral overturning of automobiles, comprising a leg pivotally connectible to the upper portion of a side of the automobile; and a pawl attachable to the side of the automobile in a position vertically below the pivot of the leg and interengaged with the latter so as to prevent separation of the parts and adapted to interlock therewith to limit the outward swing of the leg when the parts are swung outward by the tilting of the automobile.

2. A device for preventing the lateral overturning of automobiles, comprising a leg pivotally connectible to the upper portion of a side of the automobile; and a trussed pawl attachable to the side of the automobile in a position vertically below the pivot of the leg and interengaged with the latter and adapted to interlock therewith when the parts are swung outward by the tilting of the automobile.

3. A device for preventing the lateral overturning of automobiles, comprising a leg pivotally connectible to the upper portion of a side of the automobile; and a pawl attachable to the side of the automobile in a position vertically below the pivot of the leg and having a slotted end through which the leg is received, said pawl being arranged to interlock with the leg when the parts are swung outward by the tilting of the automobile.

4. A device for preventing the lateral overturning of automobiles, comprising a leg pivotally connectible to the upper portion of a side of the automobile; and a pawl attachable to the side of the automobile in a position vertically below the pivot of the leg and interengaged with the latter and adapted to interlock therewith when the parts are swung outward by the tilting of the automobile, the pawl having, also, means coöperating with the leg to lock the leg when in its outermost position.

In testimony whereof we have signed our names to this specification.

CHARLES DANIEL.
EDWARD A. JUHNKE.